(«United States Patent [19]

Nissen et al.

[11] 4,383,050
[45] May 10, 1983

[54] PROCESS FOR THE PREPARATION OF LOW TEMPERATURE FLEXIBLE POLYURETHANE ELASTOMERS

[75] Inventors: Dietmar Nissen, Heidelberg; Hans U. Schmidt, Ludwigshafen; Wolfgang Straehle, Heidelberg; Uwe Schuett, Olching; Matthias Marx, Bad Durkheim, all of Fed. Rep. of Germany

[73] Assignee: BASF Aktiengesellschaft, Ludwigshafen, Fed. Rep. of Germany

[21] Appl. No.: 318,754

[22] Filed: Nov. 6, 1981

[30] Foreign Application Priority Data

Nov. 12, 1980 [DE] Fed. Rep. of Germany ....... 3042558

[51] Int. Cl.$^3$ ..................... C08G 18/14; C08G 18/36; C08G 18/48
[52] U.S. Cl. ................... 521/174; 521/114; 521/130; 521/904; 528/48; 528/76; 528/77
[58] Field of Search ............... 521/114, 174, 130, 904; 528/48, 76, 77, 73.5

[56] References Cited

U.S. PATENT DOCUMENTS

| | | | |
|---|---|---|---|
| 2,936,293 | 5/1960 | Orth | 521/114 |
| 2,953,539 | 9/1960 | Keplinger et al. | 260/31.6 |
| 2,954,369 | 9/1960 | Karabinos et al. | 260/104 |
| 3,094,510 | 6/1963 | Parker et al. | 260/75 |
| 3,201,359 | 8/1965 | Herrick et al. | 521/130 |
| 3,248,348 | 4/1966 | Piechota et al. | 521/169 |
| 3,423,339 | 1/1969 | Andrews et al. | 521/116 |
| 3,929,732 | 12/1975 | Shah | 260/77.5 AN |
| 4,130,698 | 12/1978 | Sparrow et al. | 521/130 |
| 4,201,847 | 5/1980 | Kleimann et al. | 521/130 |

FOREIGN PATENT DOCUMENTS 874766 8/1961 United Kingdom ............... 521/114

OTHER PUBLICATIONS

Bailey's Industrial Oil and Fat Products, vol. 1 4th Ed. John Wiley & Sons (N.Y.) 1979, pp. 54, 64, 65, 74, 110, 111, 363–365, 367 and 368.
Condensed Chemical Dictionary, 5th Edition, Reinhold N.Y. (1956) pp. 827, 828, 1128.

*Primary Examiner*—H. S. Cockeram
*Attorney, Agent, or Firm*—Norbert M. Lisicki

[57] ABSTRACT

Low temperature flexible polyurethane elastomers are prepared by reacting organic polyisocyanates with polyester polyols which have glass transition temperatures of $-10°$ to $-80°$ C. and incorporating therein alkoxylated esters of fatty acids and/or alkoxylated terpene alcohols.

18 Claims, No Drawings

PROCESS FOR THE PREPARATION OF LOW TEMPERATURE FLEXIBLE POLYURETHANE ELASTOMERS

BACKGROUND OF THE INVENTION

1. Field of the Invention

The invention concerns a process for the preparation of low temperature flexible polyurethane elastomers by reacting
(a) organic polyisocyanates, preferably polyester polyol prepolymers of organic polyisocyanates with NCO contents of 10 to 25 percent by weight based on the weight of polyisocyanate,
(b) polyester diols with OH numbers of 40 to 120 and glass transition temperatures of $-10°$ to $-80°$ C. or hydroxyl group containing polytetrahydrofurans,
(c) alkoxylated esters of fatty acids and/or alkoxylated terpene alcohols,
(d) chain extenders or cross-linking agents in the presence of catalysts and optionally blowing agents in quantities of 0.1 to 6 parts by weight of component (c) per 100 parts by weight of component (b) and optionally (d) wherein the mole ratios of reactive hydrogen atoms of components (b) and (c) and optionally (d) to NCO groups of component (a) range from 0.90:1 to 1.15:1.

2. Prior Art

The preparation of polyurethane elastomers from polyester polyols, polyisocyanates and chain extenders is described in numerous literature sources, for example, *Journal of Cellular Plastics* 13, 303 (1977), *Journal Cellular Plastics* 10, 283 (1974), and *Polymers Paint Color Journal*, Polyurethanes Symposium, University Surrey, Sept. 23/25, 1974 and in British Pat. No. 1,485,986.

In addition to the many physical properties of these polyester urethane elastomers such as mechanical stability values, elasticity, elongation, low compression set, light fastness, oxidation and hydrolysis resistance, a high degree of low temperature flexibility is particularly desired.

These properties are affected primarily by the choice of raw materials for these polyurethane elastomers. In practice, linear polyesters are preferably used as the polyol component having terminal hydroxyl groups which are produced by the condensation of dicarboxylic acids with diols or products derived from caprolactones. Compared to polyurethane elastomers based on polyether polyols, these polyester polyurethanes are characterized by a greater physical strength and, furthermore, by a lesser susceptibility to the effects of light and oxidation.

While polyester polyols based on, for instance, adipic acid/1,6-hexanediol or adipic acid/1,4-butanediol have a low glass transition temperature and thus good stability when exposed to cold in the amorphous state in the polyurethane elastomer there is an increased tendency to crystallize which results in a poorer low temperature flexibility.

In addition to this, the tendency toward crystallization in a polyester polyol component also makes the processing more difficult when using the two-component one-shot system and the commonly used low and high pressure foaming equipment.

Diol mixtures were employed for the preparation of polyester polyols in attempts to prevent the crystallization and to improve the low temperature flexibility properties of the polyurethane elastomers.

The tendency to crystallize may also be reduced by incorporating branched diols in the polyester polyol, particularly 2,2-dimethylpropanediol-1,3 in addition to 1,6-hexanediol. In spite of this, the polyurethane elastomers produced with these polyester polyols did not display sufficient improvement in their low temperature flexibility. This is particularly true for cellular polyurethane elastomers with hardnesses of approximately 45 to 75 shore A and densities of approximately 0.35 to 0.65 grams per cubic centimeter when they are used for shoe sole applications, where temperatures of $-5°$ C. to $-40°$ C. are not unusual in countries with prolonged periods of sub-zero temperatures. The requirements for high quality shoe soles of polyurethane elastomers are correspondingly high and fatigue bending tests are conducted at $-25°$ C. (for instance, SATRA Test Method PM.60 in accordance with ASTM D-1052-55 and also RAL-RG 702/1 in accordance with DIN 53522). These tests are passed by the prior art polyurethane elastomers which can be used for shoe soles at room temperatures but not at test temperatures of $-25°$ C.

The purpose of this invention was to develop polyurethane elastomers preferably cellular which have low temperature flexibility and which have good flexural strength at $-25°$ C. in order that they may be used as shoe soles in countries with prolonged sub-zero degree temperatures.

DESCRIPTION OF THE PREFERRED EMBODIMENTS

Thus, the object of this invention is a process for the preparation of low temperature flexible polyurethane elastomers by reacting organic polyisocyanates, polyols, alkoxylated fatty acid esters or alkoxylated terpene alcohols in the presence of catalysts and optionally chain extenders, blowing agents, stabilizers, pigments, surface active agents and flame retardants wherein said polyols are selected from the group consisting of polyester polyols having a hydroxyl number of 40 to 120 and a glass transition temperature range of $-10°$ C. to $-80°$ C. and polytetrahydrofuran polyols having a hydroxyl number of 20 to 250.

Surprisingly, it was found that the flexural endurance properties of polyester polyurethane elastomers with glass transition temperatures of less than $-10°$ C. can be improved by the addition of alkoxylated fatty acid esters and/or alkoxylated terpene alcohols, particularly in the amounts of 0.1 to 6 parts by weight per 100 parts by weight based on the total weight of polyol and optionally chain extenders or cross-linking agents to such an extent that the flexural strength at $-25°$ C. is extended considerably and is furthermore expanded to a broader isocyanate index for the corresponding polyurethane system.

For the preparation of the polyurethane elastomers according to the process of this invention, which have low temperature flexibility, hydroxyl group containing polytetrahydrofurans having hydroxyl numbers of 20 to 250, preferably of 45 to 120 and polyester polyols with hydroxyl numbers of 40 to 120, preferably 40 to 80, glass transition temperatures of $-10°$ to $-80°$ C., preferably of $-15°$ to $-40°$ C. and more preferably $-18°$ C. to $-35°$ C., are used as the polyols. The polyester polyols are preferred to be predominantly linear, that is difunctional in the sense of the isocyanate addition reaction. If higher functionality polyester polyols are used alone or in mixture with difunctional polyester polyols, they can be used only in such quantities that the functionality or the average functionality of the mixture is a maximum of 2.5, preferably 2 to 2.2. The polyester polyols may be used individually or in mixtures.

Suitable polyester polyols may be produced, for example, by polycondensation of aliphatic dicarboxylic acid with advantageously 4 to 6 carbon atoms with diols having 2 to 6 carbon atoms and/or diglycols as well as the products derived from ω-caprolactones. Examples include dicarboxylic acids such as succinic, glutaric and preferably adipic acid. Diols such as ethylene glycol, 1,5-pentanediol, 1,6-hexanediol, neopentylglycol and preferably 1,4-butanediol, and diglycols such as diethylene glycol and dipropylene glycol with mixtures of these diols are used on a preferred basis. Polyester polyols such as hexanediol-1,6-neopentylglycol adipate, butanediol adipate, and preferably ethylene glycol adipate, 1,4-butanediol adipate, butanediol-1,4-pentanediol-1,5-hexanediol-1,6-adipate, ethylene glycol adipate, ethylene glycol-diethylene glycol adipate, and polyester polyols of succinic, glutaric and adipic acid mixtures with the diols as well as polycaprolactone diol have proven to work well.

In addition to the polyols, chain extenders or cross-linking agents with molecular weights of less than 300, preferably between 60 to 200, may be used as components reacting with isocyanates in the preparation of the polyurethane elastomers. Examples of chain extenders include diols having 2 to 6 carbon atoms or their mixtures such as ethylene glycol, 1,6-hexanediol and preferably 1,4-butanediol as well as cross-linking agents such as glycerine, trimethylolpropane and alkanolamines such as di- and triethanolamine. The molar ratio of polyol to chain extender or cross-linking agent is a function of the desired low temperature flexibility and rigidity of the polyurethane elastomers and it may be varied from 1:0.9 to 1:1.15, preferably 1:0.95 to 1:1.10.

As mentioned above, a primary requirement according to this invention for achieving polyurethane elastomers with good low temperature flexibility is the use of alkoxylated fatty acid esters and/or alkoxylated terpene alcohols for the preparation of the elastomers. Preferably used are the alkoxylated fatty acid esters and/or alkoxylated terpene alcohols in quantities of 0.1 to 6 parts by weight, preferably 1 to 5 parts by weight per 100 parts by weight of polyol and optionally chain extenders or cross-linking agents. Suitable alkoxylated fatty acid esters or terpene alcohols are obtained by alkoxylating one mole of a fatty acid ester containing 8 to 26, preferably 16 to 24 carbon atoms in the fatty acid radical or terpene alcohols with 10 to 25 carbon atoms with 1 to 30 moles, preferably 10 to 20 moles of ethylene oxide and/or propylene oxide. The alkylene oxide addition may be sequential, in blocks or as heteric mixtures.

Examples of fatty acid esters are mono-, di- and/or triglycerides of saturated and unsaturated fatty acids such as caprylic acid, lauric acid, palmitic acid, stearic acid, arachic acid, behenic acid, lignoceric acid, oleic acid, ricinoleic acid, linoleic acid, and linolenic acid and the esters of hydroxycarboxylic acids having 12 to 26 carbon atoms with alcohols having 10 to 26 carbon atoms. Particularly alkoxylated castor oil, peanut oil, tall oil and turkey red oil as well as alkoxylated terpene alcohols have proven to work particularly well. Preferably used are the alkoxylated fatty acid esters.

The organic polyisocyanates which may be employed include 4,4'-diphenylmethane diisocyanate and allophanate and/or carbodiimide group containing polyisocyanates based on 4,4'-diphenylmethane diisocyanate with NCO contents of 25 to 33 percent. Proven to have worked particularly well and therefore used on a preferred basis as polyisocyanates are polyester polyol prepolymers with NCO contents of less than 25 percent by weight, preferably 10 to 20 percent by weight based on the total weight of polyisocyanate and polyol. The polyester polyol prepolymers are advantageously prepared from 4,4'-diphenylmethane diisocyanate, optionally modified with allophanate and/or carbodiimide groups, and any of the polyester polyols mentioned above.

For the preparation of the polyurethane elastomers which have low temperature flexibility, the polyols, alkoxylated fatty acid esters and/or alkoxylated terpene alcohols and optionally the chain extenders or cross-linking agents and organic polyisocyanates are reacted in such quantities that the ratio of Zerewitinoff active hydrogen atoms, for instance bonded to OH—, $NH_2$, or NH groups to NCO groups is 0.90:1 to 1.15:1, preferably 1:1.

Suitable catalysts which may be employed are the commonly-used tertiary amines as well known to those skilled in the art, for example, dimethylcyclohexylamine, N-methylmorpholine, N,N'-dimethylpiperazine, the urea adduct of hexamethylenediisocyanate, and N-methylethanolamine, among other substances, and preferably diazabicyclo-(2,2,2)-octane. Organic metal compounds such as the ester of titanic acid, iron compounds such as iron acetonylacetonate, iron(II)chloride, zinc chloride, tin diacetate, tin dioctoate, tin dilaurate, or the tin dialkyl salts of aliphatic carboxylic acids such as dibutyltin diacetate, dibutyltin dilaurate, or similar substances may be employed.

In order to achieve favorable reaction times and, as a function of the activity of the selected catalyst and/or the catalyst mixture, the amount to be used is determined by empirical means. Advantageously used are 0.01 to 10 percent by weight, preferably 0.01 to 3 percent by weight, of catalyst based on the weight of polyol weight.

According to the process of this invention, noncellular and preferably cellular polyurethane elastomers may be produced. In order to produce cellular products, blowing agents are used. A suitable blowing agent, for instance, is water which reacts with the isocyanate groups by forming carbon dioxide. The water quantities which are used advantageously amount to 0.01 to 5 percent by weight, preferably 0.05 to 1.0 percent by weight based on the polyol weight.

Other applicable blowing agents which may either be used alone or in addition are low boiling liquids which volatilize under the influence of the exothermal polyaddition reaction. Suited for this purpose are liquids which are inert with respect to the organic polyisocyanate and which have boiling points of no more than 100° C. at atmospheric pressure, preferably between +20° and +65° C. Examples of such preferably used liquids are halogenated hydrocarbons such as methylene chloride, trichlorofluoromethane, dichlorodifluoromethane, dichloromonofluoromethane, dichlorotetrafluoroethane, and 1,1,2-dichloro-1,2,2-trifluoroethane as well as low molecular alkanes such as pentane. Mixtures of these low boiling liquids with each other and/or with other substituted or unsubstituted hydrocarbons may also be used.

The most appropriate amount of blowing agent employed for the preparation of the cellular polyurethane elastomers is a function of the density which is to be obtained as well as the amount of water used. Generally, quantities of 0.5 to 15 percent by weight, based on the weight of the polyol, provide satisfactory results.

Additives may also be incorporated in the reaction mixture. These include reaction retardation agents, stabilizers, hydrolysis protection agents, pore regulators, substances having fungicidal and bacteriocidal properties, dyes, pigments, fillers, surface-active materials and flame retardants.

Suitable surface-active substances include siloxane-oxyalkylene mixed polymerizates and other organo polysiloxanes, ethoxylated alkyl phenols, ethoxylated fatty alcohols, paraffin oils, castor oil or resinoleic acid ester and turkey red oil which are used in quantities of 0.2 to 6 parts by weight per 100 parts by weight of polyol.

Flame retardant compounds include tricresyl phosphate, tris-2-chloroethylphosphate, tris-chloropropyl-phosphate, and tris-2,3-dibromopropylphosphate and organic halogen compounds such as polybromodiphenylether, bromoligomerstyrene, inorganic flame retardants such as antimony trioxide, arsenic oxide, ammonium phosphate, calcium phosphate and red phosphorus. Generally, it has proven to be advantageous to use 5 to 50 parts by weight, preferably 5 to 25 parts by weight of one or more of the flame retardants per 100 parts by weight of polyurethane.

The cellular polyurethane elastomers are produced by well known processes. If non-cellular polyurethane elastomers are prepared by the prepolymer process, an isocyanate group containing prepolymer is initially produced from the polyol with excess polyisocyanate. After adding more polyol, alkoxylated fatty acid ester and/or alkoxylated terpene alcohol and possibly chain extenders or cross-linking agent, the substances are poured into a mold and allowed to react. If desired, the elastomer may be granulated after curing. This granulate can be pressed into various molds, extruded, injection cast or collandered at increased temperatures.

According to another mode of operation, the alkoxylated fatty acid ester and/or alkoxylated terpene alcohol chain extenders or cross-linking agents as well as additives are incorporated into the polyol and the resultant mixture is reacted with the polyisocyanate or isocyanate group containing prepolymers according to the one-step process.

For the preparation of cellular polyurethane elastomers by the one-step process, a mixture of polyol, alkoxylated fatty acid ester and/or alkoxylated terpene alcohol, chain extenders or cross-linking agents, catalyst, blowing agent and optionally additives, is generally reacted with the organic polyisocyanate or preferably isocyanate group containing prepolymers at temperatures of 15° to 85° C., preferably 30° to 70° C. If a mixing chamber with several feed nozzles is used, the starting components may be introduced individually and mixed intensively in the mixing chamber. However, it has proven to be particularly advantageous to employ the two-component process and to combine part of the polyol, the alkoxylated fatty acid ester, and/or alkoxylated terpene alcohol, catalyst, blowing agent and optionally chain extenders and cross-linking agents, and additives to form component (A) and to use the organic polyisocyanate or preferably an isocyanate-group containig prepolymer, particularly a polyester polyol prepolymer consisting of a polyester polyol and 4,4'-diphenylmethane diisocyanate having an NCO content of 25 to 10 percent by weight as the (B) component. This latter process is preferred. The advantage of this process is that the (A) and (B) components can be transported in a space-saving manner and can be stored for an extensive period of time and that they require only intensive mixing prior to the preparation of the cellular polyurethane elastomers employing low or high pressure metering equipment.

The non-cellular polyurethane elastomers produced in accordance with this invention have densities of 0.8 to 1.2 grams per liter and shore hardnesses of 35 shore A to 60 shore D. These products are used as wear surfaces in sport shoes, soles for work shoes, abrasion edges, and for other purposes.

The cellular polyurethane elastomers have densities of 0.1 to 0.8 grams per liter and are particularly well suited for the manufacture of shoe soles of running shoes and boots as well as sport shoes and the soles of training shoes.

The cellular polyurethane elastomers have extremely favorable properties when exposed to cold, particularly a good flexural strength at temperatures of −20° to −30° C.

The following examples are intended to illustrate the invention. The parts referred to in the examples are parts by weight.

EXAMPLES AND PROCESS EXAMPLES

For the preparation of cellular polyurethane elastomers, the starting materials identified in the Table were combined to form components (A) or (B), were homogenized by intensive stirring and were mixed in the referenced quantity ratios by means of a two-component metering machine, model EMB F 20 ST. The temperature of the (A) and (B) components was 50° C.

An aluminum mold having dimensions of 200 millimeters × 200 millimeters × 10 millimeters and a mold surface temperature of 45° to 50° C. was filled with 200 grams of the resultant reaction mixture and was allowed to cure in the mold. The bulk density of the resultant test panels was 0.5 grams per cubic centimeter.

The starting components are abbreviated in the Table as follows:

Polyester Polyol A: Glycol-butanediol-adipate having an OH number of 56 and a glass transition temperature of −29° C.

Mole ratio of glycol-butanediol = 2:1

Polyester Polyol B: Glycol-diglycol-adipate having an OH nubmer of 56 and a glass transition temperature of −25° C.

Mole ratio of glycol:diglycol = 1.5:1

Polyisocyanate A: An NCO group containing prepolymer based on 4,4'-diphenylmethane diisocyanate and diglycol adipate (OH number 42) having an NCO content of 20.3 percent. The prepolymer was prepared by heating 60 parts of 4,4'-diphenylemthane diisocyanate are heated to 80° C. Following this, 40 parts of diglycol adipate (OH number 42) were added to the melt while being stirred and the mixture maintained at 80° C. for 2 hours. Thereupon, the mixture was cooled to 50° C. and 20 parts of carbodiimide group containing 4,4'-diphenylmethane diisocyanate with an NCO content of 29.6 was added. The resultant prepolymer had an NCO content of 20.3 percent.

Isocyanate B: An NCO group containing prepolymer based on 4,4'-diphenylmethane diisocyanate and butanediolpentanediol-hexanediol-adipate (OH number 56) having an NCO content of 14.7±0.2 percent. This prepolymer was prepared by adding 50 parts of butanediol-pentanediol-hexanediol-adipate (OH nubmer 56) to 50 parts of 4,4'-diphenylmethane diisocyanate while stirring at 80° C. within a period of time of one hour and the reaction was completed at 80° C. within two hours. The resultant prepolymer had an NCO content of 14.7±0.2 percent.

Alkoxylated Fatty Acid Esters:

Additive A: Propoxylated castor oil having an OH number of 96.

Additive B: Terpene alcohol-isophytol (weight ratio=2:1)-ethylene oxide adduct having a hydroxyl number of 38.

Additive I: Dodecenylsuccinic acid monoester of a $C_{13}/C_{15}$ alcohol mixture.

Additive IV: Dodecylsuccinic acid dimethylaminopropylamide.

TABLE I

|  |  | Examples | | | | | | | Comparative Examples | |
|---|---|---|---|---|---|---|---|---|---|---|
|  |  | 1 | 2 | 3 | 4 | 5 | 6 | 7 | I | II |
| Composition |  |  |  |  |  |  |  |  |  |  |
| Polyester Polyol A | (Parts by Weight) | 84.46 | 84.46 | 84.46 | 79.18 | 78.14 | — | — | 84.46 | 84.46 |
| Polyester Polyol B | " | — | — | — | — | — | 78.14 | 78.14 | — | — |
| 1,4-Butanediol | " | 14.61 | 14.61 | 14.61 | 17.70 | 17.70 | 17.70 | 17.70 | 14.61 | 14.61 |
| Triethylenediamine | " | 0.42 | 0.42 | 0.42 | 0.56 | 0.56 | 0.56 | 0.56 | 0.42 | 0.42 |
| Water | " | 0.34 | 0.34 | 0.34 | 0.45 | 0.45 | 0.45 | 0.45 | 0.34 | 0.34 |
| Silicon DC 190 (Dow Corning) | " | 0.17 | 0.17 | 0.17 | 0.20 | 0.20 | 0.20 | 0.20 | 0.17 | 0.17 |
| Additive A | " | 0.5 | 1.0 | 1.5 | 1.91 | 2.95 | 2.95 | — | — | — |
| Additive B | " | — | — | — | — | — | — | 2.95 | — | — |
| Additive I | " | — | — | — | — | — | — | — | 1.0 | — |
| Additive II | " | — | — | — | — | — | — | — | — | 1.0 |
| Component B: |  |  |  |  |  |  |  |  |  |  |
| Isocyanate A | " | 93 | 93 | 93 | — | — | — | — | 93 | 93 |
| Isocyanate B | " | — | — | — | 146 | 148 | 151 | 152 | — | — |
| Physical Properties |  |  |  |  |  |  |  |  |  |  |
| Shore A |  | 60 | 59 | 58 | 53 | 53 | 53 | 50 | — | — |
| Tear Strength | [N/mm$^2$] | 7.2 | 6.8 | 6.8 | 6.1 | 6.1 | 6.1 | 6.0 | — | — |
| Breaking Elongation | [%] | 440 | 480 | 450 | 430 | 430 | 430 | 410 | — | — |
| Graves Tear Strength | [N/mm$^2$] | 12 | 9.5 | 8.3 | — | — | — | — | — | — |
| Fatigue Bending Test according to RAL-RG 702/1) [Cut growth in millimeters after 30,000 bending processes] | at 23° C. | — | — | — | none | none | none | none | — | — |
|  | at −25° C. | — | — | — | — | — | none | none | — | — |
| Fatigue Bending Test according to SATRA at −25° C. [Break after minutes] |  | 45 | 80 | 130 | — | — | — | — | 22 | 1 |
| [Cut growth in millimeters after 30,000 bending processes] |  | — | — | — | 8 | none | none | none | — | — |

The embodiments of the invention in which an exclusive privilege or property is claimed are defined as follows:

1. A process for the preparation of low temperature flexible polyurethane elastomers by reacting organic polyisocyanates, polyols, alkoxylated fatty acid esters and/or alkoxylated terpene alcohols in the presence of catalysts and optionally chain extenders, blowing agents, stabilizers, pigments, surface active agents and flame retardants wherein said polyols are selected from the group consisting of polyester polyols having a hydroxyl number of 40 to 120 and a glass transition temperature range of −10° C. to −80° C. and polytetrafuran polyols having a hydroxyl number of 20 to 250.

2. The process of claim 1 wherein the concentration of alkoxylated fatty acid esters and/or alkoxylated terpene alcohols is from 0.1 to 6 parts by weight based on 100 parts by weight of polyol and optionally chain extending agents.

3. The process of claim 1 wherein said alkoxylated fatty acid esters contain 8 to 26 carbon atoms in the fatty acid radical and 1 to 30 moles of ethylene oxide and/or propylene oxide in the alkoxy radical.

4. The process of claim 1 wherein said fatty acid esters are mono-, di-, and/or triglyceride esters.

5. The process of claim 1 wherein said alkoxylated terpene alcohols consist of alcohols containing 10 to 25 carbon atoms in the alcohol radical and 1 to 30 moles of ethylene oxide and/or propylene oxide per mole of alcohol.

6. The process of claim 1 wherein a prepolymer with an NCO content of 10 to 25 percent by weight based on the weight of polyisocyanate is employed for the preparation of the elastomers.

7. The process of claim 5 wherein the polyisocyanate is selected from the group consisting of 4,4'-diphenylmethane diisocyanate, and carbodiimide and/or allophanate group containing 4,4'-diphenylmethane diisocyanate.

8. The process of claim 4 wherein the ratio of reactive hydrogen atoms of the polyols, alkoxylated fatty acid esters, and/or alkoxylated terpene alcohols and optionally chain extenders or cross-linking agents to NCO groups of the polyisocyanates or NCO group containing prepolymers, is 0.90:1 to 1.15:1.

9. A process for the preparation of low temperature flexible elastomers wherein
   (a) polyester polyol prepolymers with NCO contents of 10 to 20 percent by weight based on the weight of polyisocyanate,
   (b) polyesterdiols having OH numbers of 40 to 120 and glass transition temperatures of −10° C. to −80° C.,
   (c) alkoxylated fatty acid esters produced by alkoxylation of fatty acid esters having 8 to 26 carbon atoms in the fatty acid radical with ethylene and/or propylene oxide in a mole ratio of 1:1 to 1:30 and
(d) optionally chain extenders or cross-linking agents are reacted in the presence of catalysts, blowing agents and additives in quantities of 0.1 to 6 parts by weight of component (c) per 100 parts by weight of component (b) and optionally (d), wherein the mole ratios of reactive hydrogen atoms of the components (b), (c) and optionally (d) to the NCO groups of components (a) range from 0.90:1 to 1.15:1.

10. The product of claim 1.
11. The product of claim 2.
12. The product of claim 3.
13. The product of claim 4.
14. The product of claim 5.
15. The product of claim 6.
16. The product of claim 7.
17. The product of claim 8.
18. The product of claim 9.

* * * * *